FREDERICK A. BERG
INVENTOR

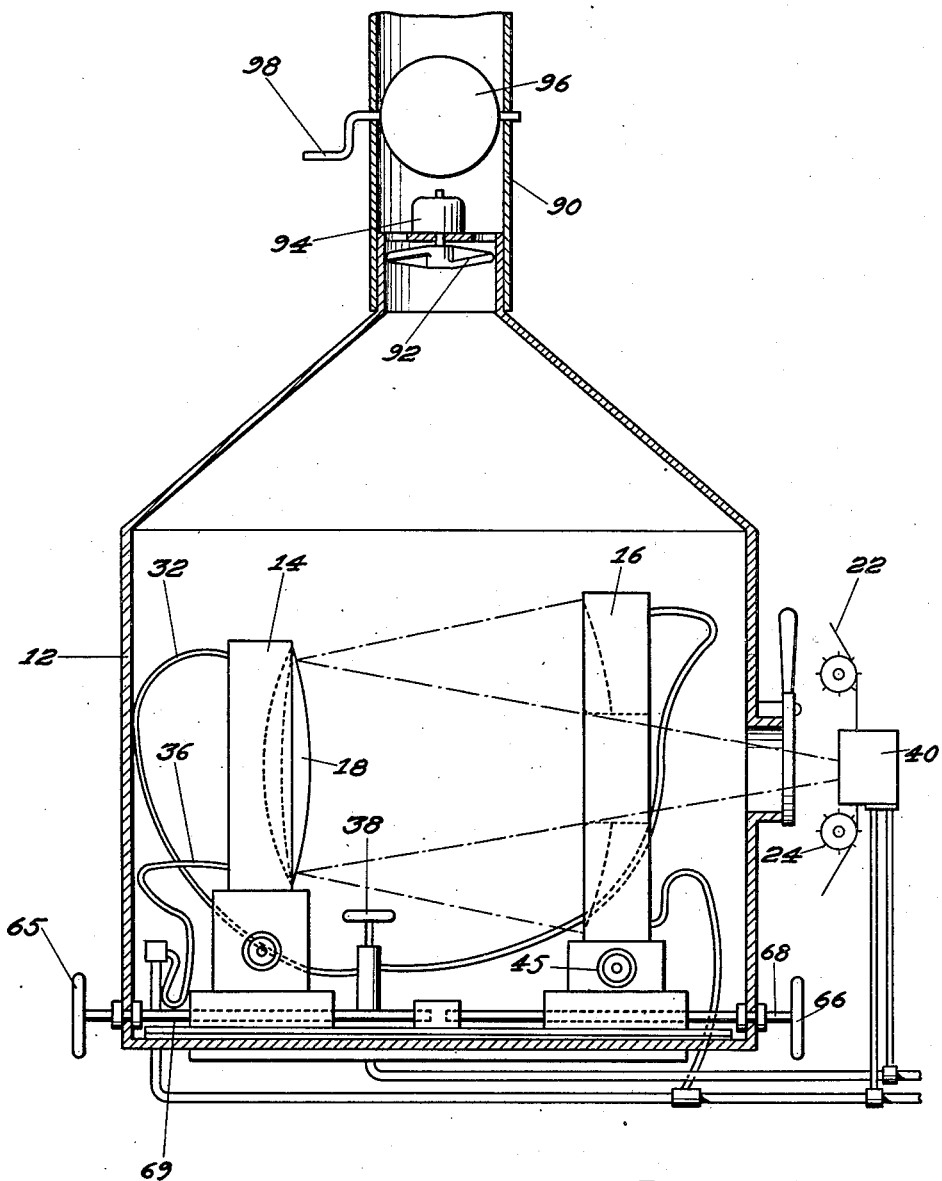

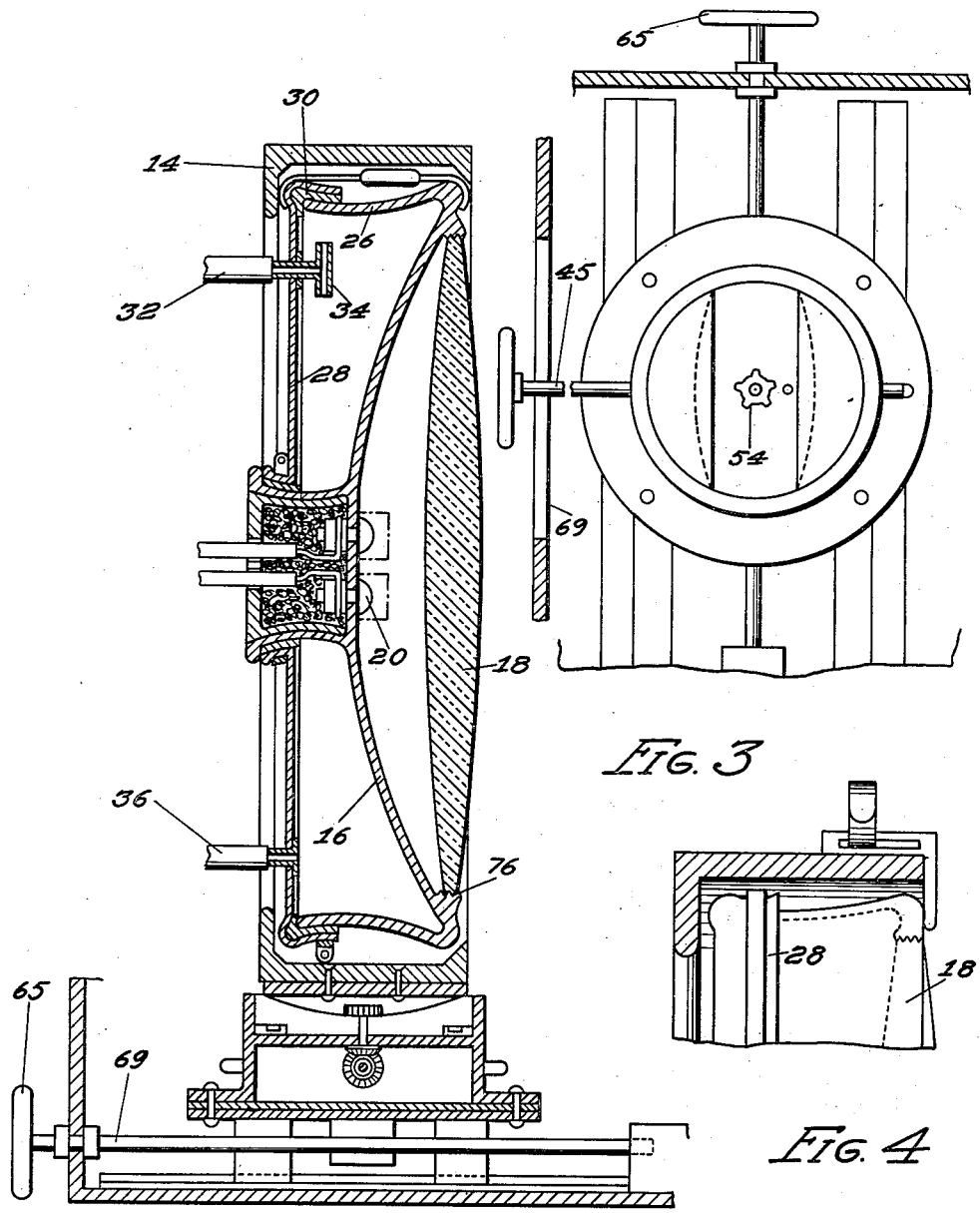

PER
ATTORNEY

Sept. 26, 1933.                F. A. BERG                    1,928,002
                       HIGH INTENSITY GASEOUS LIGHT
                    Filed May 30, 1930        4 Sheets-Sheet 4
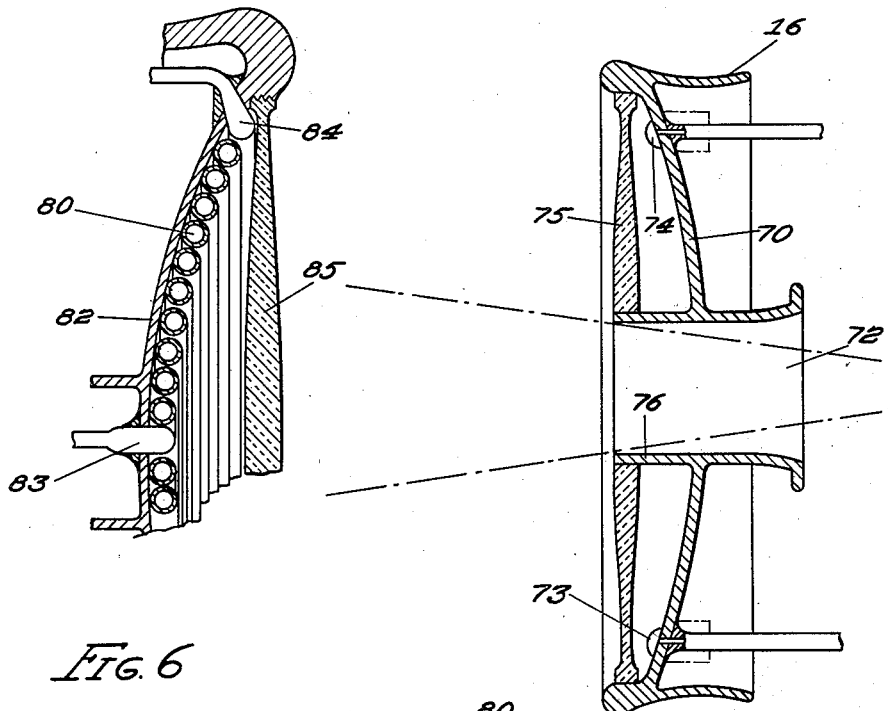
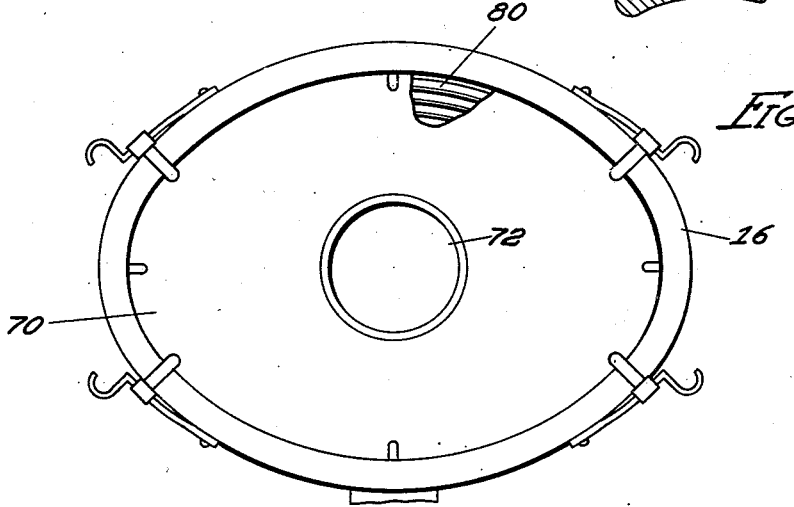
FREDERICK A. BERG
INVENTOR
PER
ATTORNEY Patented Sept. 26, 1933

1,928,002

UNITED STATES PATENT OFFICE 1,928,002

HIGH INTENSITY GASEOUS LIGHT

Frederick A. Berg, Chicago, Ill.

Application May 30, 1930. Serial No. 457,635

13 Claims. (Cl. 88—24)

This invention relates to improved high intensity gaseous light and has for one of its principal objects the provision of a concentrated beam of light produced by the passage of a relatively high voltage current through a space filled with rare gas.

Another important object of this invention is the provision of a source of light produced by energizing the electrons in a gas charged bulb either by current passing directly therethrough or by inducing a magnetic field in the bulb by means of an extraneous current.

Another and further important object of the invention is the provision of a source of light, preferably white light, of high intensity and capable of being condensed into a parallel beam and which is accordingly adapted for use in various fields and particularly motion picture projection work.

Still another and further important object of the invention is to provide a source of illumination which comprises a glow lamp or vapor bulb, the invisible rays from which are adapted to activate a luminescent substance spread over a surface remote from the glow lamp, thereby producing an invisible source of light.

This application constitutes a continuation in part of and a companion case to this same applicant's pending application for patent on High intensity multiple arc projection lamp machine filed December 7, 1929, Serial No. 412,309.

This invention contemplates the use with a gaseous source of high intensity light of a plurality of reflecting and condensing mirrors which are universally adjustable and hydraulically cool as outlined in the co-pending case hereinbefore referred to.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved projection apparatus of this invention, the same shown as embodying gaseous sources of light, and with parts broken away to illustrate the hydraulic cooling features, the universal adjustable means, and the ventilating elements.

Figure 2 is a vertical sectional view of an improved gaseous source of light, and condensation and cooling means therefor as embodied in the principles of this invention.

Figure 3 is a detail view of the universal adjusting means for the lamp mounting.

Figure 4 is a detail sectional view of the lamp and lens housing construction.

Figure 6 is a detail sectional view showing a modified source of gaseous light.

Figure 7 is a front view of one of the sources of light showing the elliptical condensing reflector and the central opening therein for passage of reflected and condensed light rays therethrough.

Figure 8 is a sectional view taken on the line 8—8 of Figure 7.

As shown in the drawings:

Figure 5:
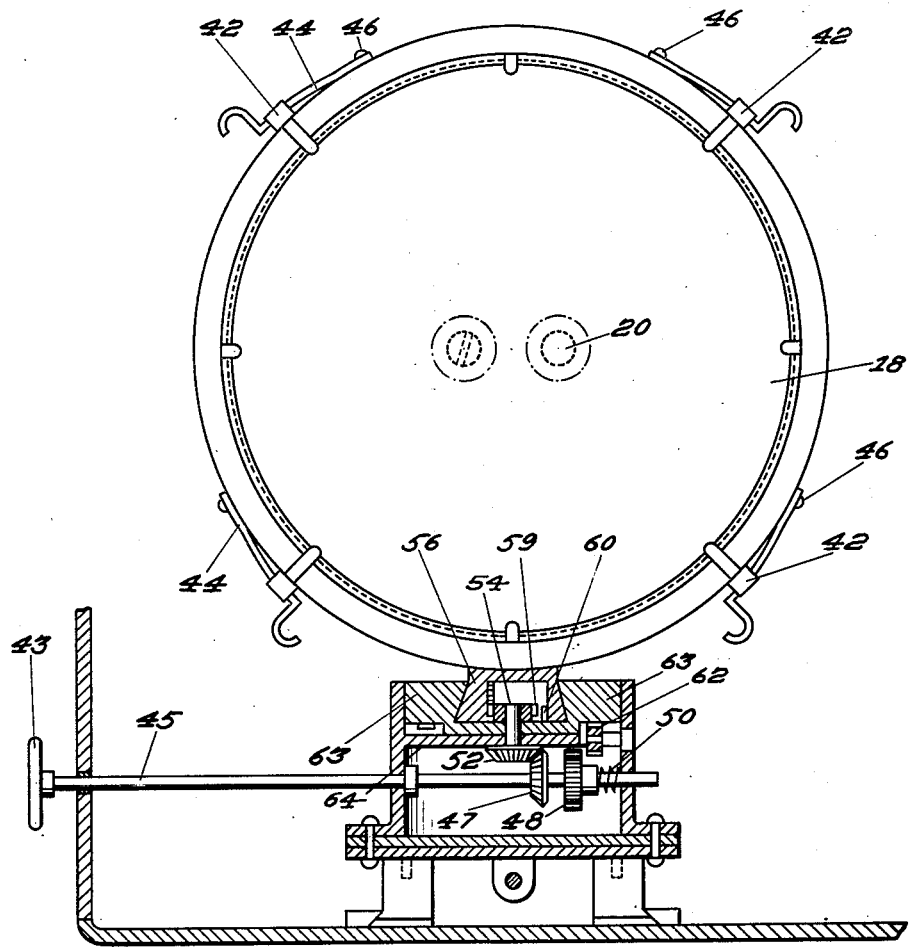
Figure 5 is a front view of one of the gaseous sources of light illustrating the universal adjustable mounting therefor.

The reference numeral 10 indicates generally the casing of an improved motion picture projection machine as embodied in this invention, the same having multiple sources of light therein as illustrated at 14 and 16, the source of light 14 being more definitely illustrated in Figures 2 and 5, and comprising essentially a reflector 16 having a condensing double convex lens 18 mounted before it, the space between the reflector and the lens being first evacuated and then filled or partly filled with a rare gas such as argon, krypton, helium, etc., which when energized by the passage of current therethrough from electrodes 20 will glow, thereby producing a source of light which when further condensed and passing through the film 22 operated by the sprockets 24 through the projector mounting shown in Figure 1 will cast an image upon a screen in the usual manner.

Sufficient current is impressed upon the electrodes 20 to operate the lamp in a satisfactory manner, the voltage and amperage depending upon the capacity of the lamp, and as considerable heat is obviously generated by the passage of a considerable amount of current, cooling means are provided in the housing 14 comprising essentially a rearward integral extension 26 of the reflector 16, this being fastened in a mounting or backing plate 28 by means of clips or clamps 30 as more definitely described in the co-pending application hereinbefore referred to.

An inlet pipe 32 for cooling fluid such as a liquid or a gas is provided, this terminating in a T-shaped spout 34 wherein the cooling fluid is effectively dispensed, the same being withdrawn through an outlet pipe or the like 36 at the bottom of the casing.

As best shown in Figure 1, the supply of cooling fluid through the tubes 32, 36, etc. is controlled by means of a valve or the like 38 mounted in the housing 12, the cooling fluid being also applied to the space in the rear of the combined reflector and lamp 16 and also to the film aperture housing 40.

As best illustrated in Figure 5, the glow lamp casing is supported in its housing by means of a series of clamps or the like 42, each comprising a resilient leaf-spring element 44 mounted on the casing by means of a single rivet or the like 46 whereby pivotal action of the retaining clamps is possible.

The entire housing is mounted for universal adjustment and also for forward and rearward tilting, this being accomplished by means of a single operating handle 43 outside the lamp housing mounted on a shaft 45 which in turn has positioned thereon a bevel-gear 47 and a plane gear 48. A helical spring 50 normally impels the shaft 45 forwardly so that the bevel-gear 47 is normally in mesh with a corresponding bevel-gear 52. This gear 52 is mounted upon a supporting shaft 54 which in turn is positioned in a plate 64 and upon the upper end of this shaft 54 is another gear 59 which meshes with a rack 60 integral with the mirror support 56 whereby the mirror may be rotated about its vertical axis.

Upon operating the handle 42 inwardly against the pressure of the spring 50, the gear 48 is caused to mesh with a pinion 62 which is mounted on a shaft 63 fitted in bearings in the support for the plate 64. This pinion 62 is always in mesh with a circular rack 63 which is integral with and forms part of the bottom of the mirror support or base 56 as best shown in Figure 5. Obviously, a rotation of the handle 42 when the mirrors 48 and 62 are in mesh will impart a forward or rearward tilting movement to the mirror.

The relation of the parts 56 and 60 is such that a frictional sliding fit is provided which maintains this support in desired position at all times, and without any possibility of its becoming loose or displaced. Further, the V-shaped support cannot be forced upwardly upon operation of the gear 59.

In this way, the mirror is tilted forwardly or rearwardly and at the will of the operator, and when set in this position, will remain so, even though the operating handle 43 is later used for rotation of the mirror.

In order to adjust the combined mirrors and lamps relatively with respect to each other and also longitudinally in the casing itself, further operating handles are provided designated by the reference numerals 65 and 66. These handles are mounted on screw-threaded shafts 67 and 68 respectively, the same passing through correspondingly screw-threaded openings in the base supports for the combined mirrors and lamps 14 and 16 whereby rotation of the wheels 65 and 66 will impart a corresponding forward or rearward sliding movement to the said combined mirror and lamp housings in the casing 12. In this way, longitudinal adjustment of the lamps with respect to each other and with respect to the housing and the film aperture is provided so that a proper condensing and focusing of the resultant light rays can be effected.

As best shown in Figure 3 a slot 69 is provided in the side of the housing 12 for slidable movement of the shaft 45 therein when the longitudinal position of the mirror and lamp mounting is adjusted by rotation of the hand wheel or handle 65.

As best illustrated in Figures 7 and 8, the lamp housing and mirror support 16 comprises essentially an elliptical reflector 70 so that proper condensing of the light rays may be effected by original emission and subsequent reflection from the mirror and the housing 14 which light rays themselves pass through a corresponding opening 72 in the elliptical mirror 70 in the mounting 16.

As will be noted from an inspection of Figure 8, the electrodes for the combined mirror and glow lamp 70 are separated, one of the electrodes 73 being positioned in the lower part of the apparatus and the other electrode 74 being at the upper part, thereby providing for the use of a high intensity and high frequency current, and a more effective electron ionization. The condensing lens 75 is formed with an opening in its center to correspond with the opening 72 and is cemented into position so as to provide a space between the lens and reflector which is properly proof against leakage of gas.

A slight modification of the means for producing the source of light is shown in Figure 6, the same comprising a single tube 80 wound into spiral form against a reflector 82, the same having been evacuated and filled with a rare gas of some sort and at proper pressure and provided with electrodes 83 and 84 at its inner and outer ends respectively. Here also a condensing lens of the double convex type may be employed as shown at 85. A plane window may also be used.

Obviously, the reflectors may be spherical or parabolic in section depending upon the condensing and resultant parallelism desired for the light ray effect and the thickness and curvature of the condensing lens may be varied to suit particular requirements. The source of light is preferably white, but may be colored, if desired, depending upon the kind or quality of the gaseous filling of the tubes or vacuum spaces.

In the top of the housing is fitted a ventilating shaft 90 which has at its lower end a fan 92 operated by a motor 94 so that a considerable current of air may be drawn therethrough for additional cooling purposes. A damper is provided in the shaft as illustrated at 96, this being operated by means of a handle 98 so that the flow of air through the housing may be conveniently regulated, a corresponding series of inlets for air being placed in the lower sides of the housing.

These vapor bulbs may be screened, and the invisible rays emanating therefrom can be utilized to activate luminescent substances on a special screen for picture projection or merely to activate such luminescent substances painted on the ceiling and walls of a room or building, and so produce light in a room which has no visible source of illumination. The combination of the luminescent paints and these glow lamps can be made to produce a large amount of light for a short period or a small amount of light for a long period, even after the activating source is cut off. The intensity and period of luminosity depends to a considerable extent upon the wave length of the activating source. In this way, a combination of such a projection apparatus and optical device will make it possible to decorate rooms and buildings with no other media than light.

It will be evident that, herein is provided a multiple glow lamp source of high intensity light for projection machines and similar devices which in addition to providing a desirable quantity of available light by ionization of electrons in gaseous filled space will also provide for the dissipation of any heat involved in this process, this heat dissipation being preferably accomplished by means of a novel hydraulic or fluid actuated system, which also provides for the cooling of the film aperture housing. Additionally, means is provided for an actual air cooling or blower system whereby a continuous cooling and cleaning effect is accomplished.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A high intensity multiple glow lamp projection machine, including a plurality of adjustably mounted ionized gas lamps, and means for adjusting said lamps in the machine both tiltably, slidably, and rotatably, said means comprising a single operating handle for each lamp, a shaft for the handle, and a spring on the shaft for normally forcing the handle into position for turning a lamp about its vertical axis.

2. A high intensity multiple glow lamp projection machine, including a plurality of adjustably mounted ionized gas lamps, each lamp including a gas envelope comprising a reflecting mirror and a lens and means for adjusting said lamps in the machine both tiltably, slidably, and rotatably, said means comprising a single operating handle for each lamp, a shaft for the handle, a bevel-gear and a plane gear on the shaft, said bevel-gear accomplishing rotation of the reflector mirrors about a vertical axis and the plane gear accomplishing tiltable movement thereof.

3. A high intensity multiple glow lamp projection machine, including a plurality of adjustably mounted ionized gas lamps, each lamp including a gas envelope comprising a reflecting mirror and a lens and means for adjusting said lamps in the machine both tiltably, slidably, and rotatably, said means comprising a single operating handle for each lamp, a shaft for the handle, a bevel-gear and a plane gear on the shaft, said bevel-gear accomplishing rotation of the reflector mirrors about a vertical axis and the plane gear accomplishing tiltable movement thereof, and an additional shaft and handle for longitudinal adjustment of the combined mirror and lamp.

4. In a motion picture lamp projector, a plurality of combined glow lamps each lamp comprising a gas envelope composed of a reflecting mirror and a lens, one of said mirrors being of a spherical section and the other of said mirrors being of an elliptical section the mirrors arranged in juxtaposed relation.

5. In a motion picture lamp projector, a plurality of combined glow lamps each lamp comprising a gas envelope composed of a reflecting mirror and a lens, one of said mirrors being of a spherical section and the other of said mirrors being of an elliptical section, the mirrors arranged in juxtaposed relation and the elliptical mirror having an opening therein for the passage of light rays from both mirrors to the projector aperture.

6. In a motion picture lamp projector, a plurality of combined glow lamps each lamp comprising a gas envelope composed of a reflecting mirror and a lens, one of said mirrors being of a spherical section and the other of said mirrors being of an elliptical section, the mirrors arranged in juxtaposed relation and the elliptical mirror having an opening therein for the passage of light rays from both mirrors to the projector aperture, the spherically sectioned mirror provided with a pair of electrodes in its center for the introduction of energizing current to a rare gas before the mirror.

7. In a motion picture lamp projector, a plurality of combined glow lamps each lamp comprising a gas envelope composed of a reflecting mirror and a lens, one of said mirrors being of a spherical section and the other of said mirrors being of an elliptical section, the mirrors arranged in juxtaposed relation and the elliptical mirror having an opening therein for the passage of light rays from both mirrors to the projector aperture, the spherically sectioned mirror provided with a pair of electrodes in its center for the introduction of energizing current to a rare gas before the mirrors, and the elliptically sectioned mirror having electrodes positioned at the remote points thereof for gas ionization.

8. In a motion picture lamp projector, a plurality of combined glow lamps each lamp comprising a gas envelope composed of a reflecting mirror and a lens, one of said mirrors being of a spherical section and the other of said mirrors being of an elliptical section, the mirrors arranged in juxtaposed relation, and the elliptical mirror having an opening therein for the passage of light rays from both mirrors to the projector aperture, the spherically sectioned mirror provided with a pair of electrodes in its center for the introduction of energizing current to a rare gas before the mirror, and means for retaining the rare gas before the mirror, said means comprising a condensing lens cemented into position in front of the mirror.

9. In a motion picture lamp projector, a plurality of combined glow lamps and condensing mirrors, one of said mirrors being of a spherical section and the other of said mirrors being of an elliptical section, the elliptical mirror having a housed opening in the center thereof for the passage of light rays from both mirrors to the projector aperture, the spherically sectioned mirror provided with a pair of electrodes in its center for the introduction of energizing current to a rare gas before the mirror, and means for retaining the rare gas before the mirror, said means comprising a transparent plate cemented into position in front of the mirror.

10. In a motion picture lamp projector, a plurality of combined glow lamps and condensing mirrors, one of said mirrors being of a spherical section and the other of said mirrors being of an elliptical section, the elliptical mirror having a housed opening in the center thereof for the passage of light rays from both mirrors to the projector aperture, the spherically sectioned mirror provided with a pair of electrodes in its center for the introduction of energizing current to a rare gas before the mirror, and the elliptically sectioned mirror having electrodes positioned at the remote points thereof for gas ionization, said elliptically sectioned mirror having an opening in the center thereof and means for retaining a rare gas in the space before the mirror, said means comprising a transparent plate cemented to the forward edges of the said mirror.

11. In a motion picture lamp projector, a plurality of combined glow lamps and condensing mirrors, one of said mirrors being of a spherical section and the other of said mirrors being of an elliptical section, and the elliptical mirror having an opening therein for the passage of light rays from both mirrors to the projector aperture, the spherically sectioned mirror provided with a pair of electrodes in its center for the introduction of energizing current to a rare gas before the mirror, means for retaining the rare gas before the mirror, said means comprising a transparent plate cemented into position in front of the mirror, and the elliptically sectioned mirror having electrodes positioned at the remote points thereof for gas ionization, said elliptically sectioned mirror having an opening in the center thereof and means for retaining a rare gas in the space before the mirror, said means comprising a transparent plate cemented to the forward edges of the said mirror, the plate having a central opening therein and a connecting housing between the edges of the said central opening and the corresponding edges of the central opening in the mirror.

12. In a motion picture lamp projector, a plurality of combined glow lamps and condensing mirrors, one of said mirrors being of a spherical section and the other of said mirrors being of an elliptical section, and the elliptical mirror having an opening therein for the passage of light rays from both mirrors to the projector aperture, the spherically sectioned mirror provided with a pair of electrodes in its center for the introduction of energizing current to a rare gas before the mirror, means for retaining the rare gas before the mirror, said means comprising a transparent plate cemented into position in front of the mirror, and the elliptically sectioned mirror having electrodes positioned at the remote points thereof for gas ionization, said elliptically sectioned mirror having an opening in the center thereof and means for retaining a rare gas in the space before the mirror, said means comprising a condensing lens cemented to the forward edges of the said mirror.

13. In a motion picture lamp projector, a plurality of combined glow lamps and condensing mirrors, one of said mirrors being of a spherical section and the other of said mirrors being of an elliptical section, and the elliptical mirror having an opening therein for the passage of light rays from both mirrors to the projector aperture, the spherically sectioned mirror provided with a pair of electrodes in its center for the introduction of energizing current to a rare gas before the mirror, means for retaining the rare gas before the mirror, said means comprising a transparent plate cemented into position in front of the mirror, and the elliptically sectioned mirror having electrodes positioned at the remote points thereof for gas ionization, said elliptically sectioned mirror having an opening in the center thereof and means for retaining a rare gas in the space before the mirror, said means comprising a condensing lens cemented to the forward edges of the said mirror, the lens having a central opening therein and a connecting housing between the edges of the said central opening and the corresponding edges of the central opening in the mirror.

FREDERICK A. BERG.